United States Patent [11] 3,548,105

[72] Inventor Cleo D. Anderson
Colts Neck, N.J.
[21] Appl. No. 680,198
[22] Filed Nov. 2, 1967
[45] Patented Dec. 15, 1970
[73] Assignee Bell Telephone Laboratories, Incorporated
Murray Hill, N.J.
a corporation of New York

[54] OVERLOAD MONITOR FOR TRANSMISSION SYSTEMS
6 Claims, 4 Drawing Figs.

[52] U.S. Cl. 179/15, 179/175
[51] Int. Cl. H04j 1/16
[50] Field of Search 179/15, 175, 175.3, 15T; 317/27; 324/140

[56] References Cited
UNITED STATES PATENTS

| | | | |
|---|---|---|---|
| 1,784,176 | 12/1930 | Carpe | 179/15 |
| 2,694,140 | 11/1954 | Gilman et al. | 179/15 |

*Primary Examiner*—Kathleen H. Claffy
*Assistant Examiner*—David L. Stewart
*Attorneys*—R. J. Guenther and E. W. Adams, Jr.

ABSTRACT: A group of frequency division multiplexed signal channels is modulated by a swept frequency signal and the resultant modulated wave is delivered to a band-pass filter which serves to pass a narrow band of frequencies. In this manner the narrow band of the filter is effectively swept over th group of frequency multiplexed channels. A sweep control circuit controls the sweep so that the rate thereof is proportional to the difference between the power output of the filter and a preselected power threshold level. If the power output of the filter exceeds the threshold level the sweep is stopped and it remains stopped throughout the period that said threshold is exceeded. An alarm light is energized when the sweep of said narrow band over said group of channels takes longer than a given time interval.

Switching apparatus connects, in succession, a plurality of groups of frequency multiplexed channels to the modulator input where they are sequentially examined as described in a cyclic and repetitive fashion.

INVENTOR
C. D. ANDERSON
BY John K. Mullarney
ATTORNEY

OVERLOAD MONITOR FOR TRANSMISSION SYSTEMS

BACKGROUND OF THE INVENTION

This invention relates to signal transmission monitoring systems and, more particularly, to an overload monitor for detecting the presence of overload signals in any channel of a group of frequency division multiplexed signal channels.

Frequency division multiplexed transmission systems are normally designed to carry a specific average power per channel. There is usually a further restriction on the maximum allowable power of single frequency signals or tones. These load restrictions are necessary to insure satisfactory noise and crosstalk performance. Signals whose sustained power spectra exceed these criteria are termed overload signals.

Narrow band overloads such as an unmodulated carrier in a data channel may produce excessive crosstalk or single frequency tone interference if the design limits (i.e., allowable maximum power) of the transmission facility are exceeded. Other single frequency or narrow band overloads caused, for example, by the "singing" of one or more repeaters also create crosstalk and intolerable interference which usually exceed the design limits. However, high-volume talker bursts often momentarily exceed the system design limits which are set on the basis of long term average power. Hence it becomes necessary to discriminate between narrow band overloads and talker bursts.

It is accordingly a primary object of the present invention to reliably distinguish between sustained overloads above a given design limit and high-volume talker bursts.

Broadband overloads, whose total power is excessive but no single frequency component thereof exceeds the threshold or design limit, typically cause excess intermodulation noise. Such broadband overloads usually extend over a plurality of channels of a group of frequency division multiplexed channels.

It is, therefore, a further object of the present invention to detect the presence of broadband overloads where the total power thereof is excessive but no single frequency component exceeds the design threshold of the transmission system.

SUMMARY OF THE INVENTION

These and other objects are obtained in accordance with the present invention wherein the narrow-pass band of a band-pass filter is effectively swept in frequency over a group of frequency division multiplexed signal channels for the purpose of detecting the presence of sustained overload signals in any of the channels. The sweep rate is controlled so as to be proportional to the difference between the power output of the band-pass filter and a preselected power threshold level. If the power output of the filter exceeds the threshold level the sweep is stopped and it remains stopped throughout the period that said threshold level is exceeded. An alarm indication is produced when the sweep of said narrow-pass band over said group of frequency multiplexed channels takes longer than a given time interval.

A plurality of groups of frequency multiplexed channels are successively examined as above described in a cyclic and repetitive fashion.

DETAILED DESCRIPTION

Figure 1:
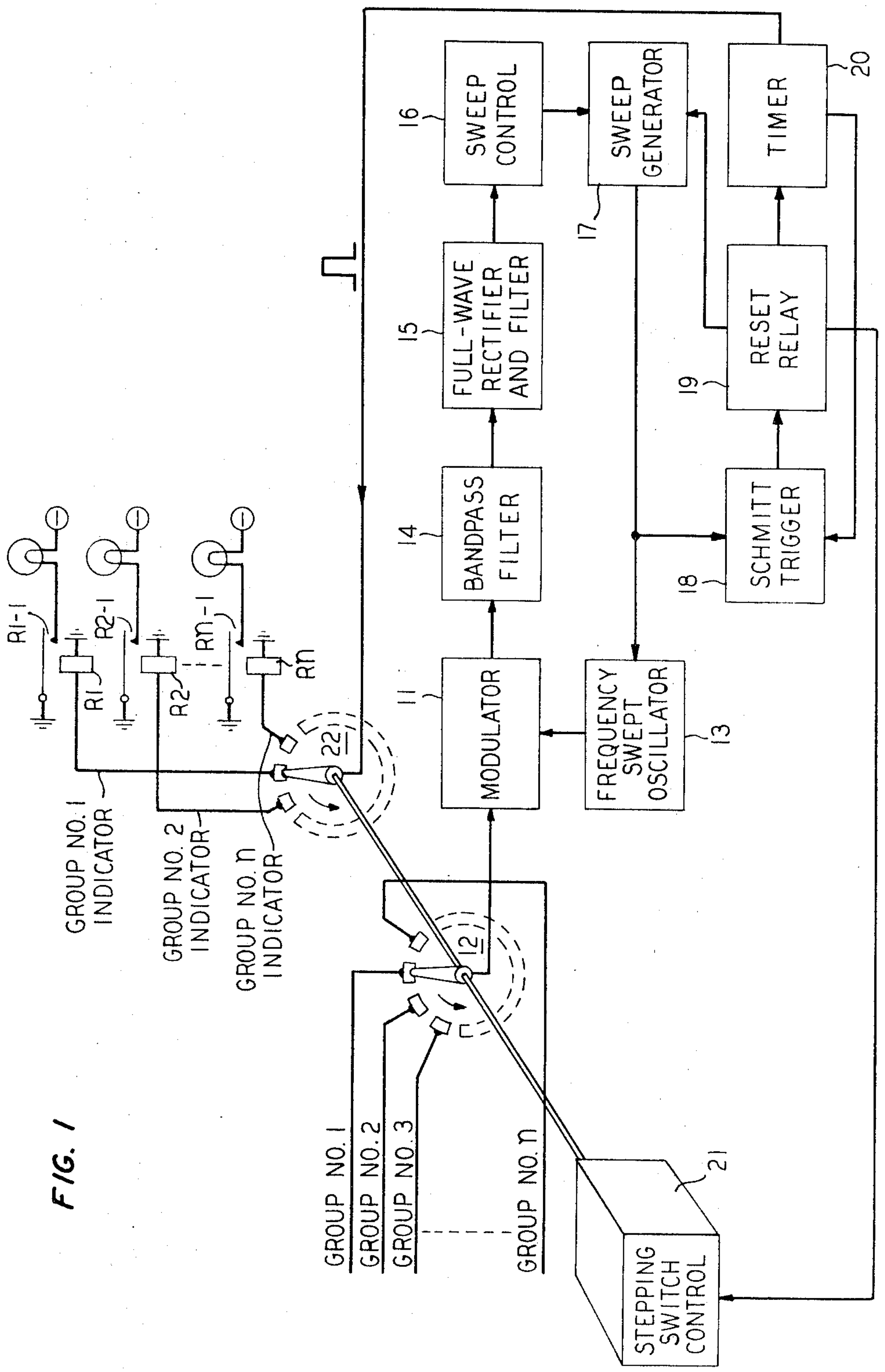
FIG. 1 illustrates a schematic block diagram of an overload monitor in accordance with the present invention.

Referring now to the drawings, FIG. 1 shows in schematic block form an overload monitor for detecting the presence of overload signals in any channel of a group of frequency division multiplexed signal channels. A group of signal channels is coupled to the input of the modulator 11 via the stepping switch 12. For present purposes, the group shall be considered to comprise 16 frequency multiplexed channels each of 3 kHz. bandwidth, with the group spectrum extending from 60 to 108 kHz. The group of channels is modulated, in conventional fashion, by a carrier signal derived from oscillator 13. This carrier signal is varied or swept in frequency from 110 to 158 kHz. Numerous arrangements are known in the art for deriving such a swept frequency signal. For example, the oscillator may comprise a conventional L-C tank circuit having a *p-n* junction in parallel therewith. As the potential applied across the *p-n* junction is varied its capacitance changes and this effects a change in the frequency of oscillation. Alternatively, a free running transistorized multivibrator can be used with the rate or frequency thereof determined by the potential applied to the bases.

The output of modulator 11 is delivered to a 1 kHz. wide band-pass filter 14 centered at a frequency of 50 kHz., which is the difference frequency of the input signals to the modulator. In this manner a "window" 1 kHz. wide is effectively swept across the group of frequency multiplexed channels.

The output of band-pass filter 14 is full-wave rectified and then smoothed with a low-pass filter (e.g., 150 Hz.) in the rectifier-filter 15. The resultant rectified and smoothed signal is delivered to the sweep control circuit 16 which, as the name implies, controls the sweep signal generated by sweep generator 17.

The sweep generator 17 generates a linear, sawtooth voltage which when delivered to the oscillator 13 causes the frequency of the same to be swept over the specified range of 110 to 158 kHz. The sweep control 16 actually controls sweep rate so that the latter is proportional to the difference between the power output of the band-pass filter and a preselected power threshold level. The sweep control and sweep generator will be described in detail hereinafter.

The sawtooth voltage output of generator 17 is also coupled to the input of the Schmitt trigger circuit 18, which has a preselected trigger threshold level. Ordinarily, when no overloads are present, the sweep generator output voltage will increase until the Schmitt trigger fires and drives the reset relay 19. The Schmitt threshold level is set so that it fires at the end of the sweep, i.e., when the oscillator frequency reaches 158 kHz.

Reset relay 19 comprises a relay and a plurality of contacts. When the reset relay is energized by the output signal from the Schmitt trigger a first pair of contacts "make" and discharge the charging capacitor of the sweep generator. The sweep generator is thus reset to its initial or starting condition. This will be further discussed hereinafter. In a similar manner, the timer 20 is reset to its starting condition and a new timing period is begun. Lastly, a third pair of contacts "make" and thereby complete a path to ground for a stepping relay in the stepping switch control 21. The brushes of the rotary stepping switches 12 and 22 are thereby advanced one position in a counterclockwise direction. This serves to connect the next group of signal channels to the modulator 11. While a rotary-type stepping switch has been shown in the drawing, it should be apparent that any of the conventional stepping switches known in the art can be advantageously utilized herein.

The timer 20 may comprise a monostable multivibrator which, in the absence of a sustained overload signal, is reset upon completion of each sweep, thus inhibiting the output pulse therefrom. However, when the timing period has elapsed, the timer changes states and thereby produces an output pulse. This is indicative of the fact that an overload signal is present in the group of signal channels presently being examined. The timing period can be set or adjusted by means of a variable resistance in the charging capacitor of the monostable multivibrator. The duration of the timing period is usually arrived at empirically.

When the timer 20 times out, indicating the presence of an overload signal, an output pulse is delivered to the brush of stepping switch 22. This output pulse is therefore coupled via switch 22 to one of the relays R1, R2...R*n*. A pair of contacts are associated with each relay and when the latter is energized the associated contacts "make." The contacts are of the magnetic latching type and hence when they "make" they remain in this state even after the relay is no longer energized. When a given pair of the magnetic latching relay contacts (R1-1, R2-1...R*n*-1) close, a path to ground is completed for the series-connected lamp. The lamp then remains lit until a station attendant manually "breaks" the connecting contacts. The lighting of an alarm lamp indicates the detection of an overload in the group of signal channels under examination.

In addition to lighting the appropriate overload indicator lamp the timer 20 sends a pulse to the Schmitt trigger circuit 18 which causes the same to fire and thereby energize the reset relay 19. The reset relay then resets the sweep generator and timer, and it switches the monitor apparatus to the next group of signal channels to be examined, all as heretofore described.

Summarizing the above, a group of frequency division multiplexed signal channels is modulated by a swept frequency signal and the resultant modulated wave is delivered to a band-pass filter which serves to pass a narrow band of frequencies. The narrow band of the filter is therefore effectively swept over the group of signal channels. The sweep rate is controlled so as to be proportional to the difference between the power output of the filter and a preselected power threshold level. If the power output of the filter exceeds the threshold level the sweep is stopped and it will remain stopped as long as the threshold is exceeded, but will continue if the signal momentarily decreases below the threshold. The maximum group observation time is controlled by the timer. Ordinarily, when no overloads are present, the sweep generator output voltage will increase steadily until the Schmitt trigger fires and drives the reset relay. The reset relay then resets the sweep generator and the timer, and it also serves to switch to the next group of signal channels to be examined. However, if an overload signal exists in the group, the sweep is significantly decreased in rate or even stopped, the maximum observation time (i.e., the timing period) will be exceeded, and an output pulse from the timer will actuate an alarm light. The overload monitor then goes on to the next group to be examined while leaving the overload indicator light activated. The same switching apparatus which selects the group load will also switch a corresponding group overload indicator into the system.

A plurality of groups of frequency multiplexed channels are successively examined as above described in a cyclic and repetitive fashion.

Figures 2A, 2B, 3:
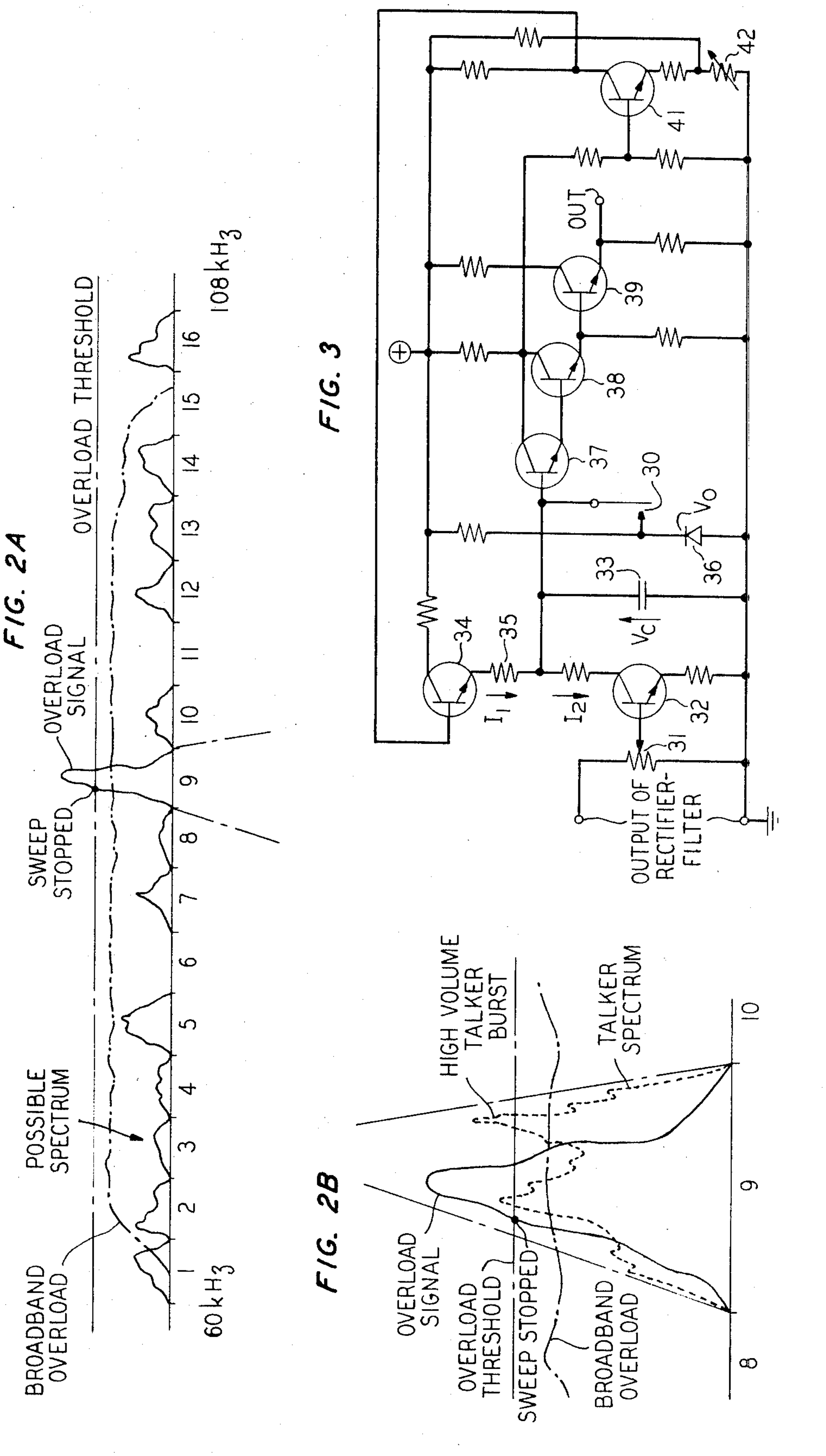
FIGS. 2A and 2B show certain waveforms useful in the explanation of the invention.
FIG. 3 is a schematic circuit diagram of the sweep control and sweep generator of FIG. 1.

FIGS. 2A and 2B exemplify the operation of the sweep control. FIG. 2B is a blown-up replica of channel 9 of FIG. 2A, with a typical talker spectrum included. An exemplary group of 16 frequency division multiplexed signal channels is shown in FIG. 2A; each channel is of 3 kHz. bandwidth, with the group spectrum extending from 60 to 108 kHz. All channels are not likely to be in use at the same time and hence channels 6, 11, and 15 are assumed inactive for the present. As the 1 kHz. "window" is effectively swept across the group of signal channels the sweep rate is varied continuously as a function of the signal activity in the respective channels. And since the rate of sweep is essentially inversely proportional to this signal activity, it will be apparent that the sweep of inactive channels 6, 11, and 15 takes place at a faster rate than say the sweep of presently active channels 5, 14, and 16. Under normal conditions, (i.e., no overload), the sweep of the group spectrum is completed prior to the timer 20 timing out. Moreover, the completion of the sweep invariably takes place even if all of the signal channels are active.

Should an overload signal, such as that shown in channel 9, be encountered the sweep is stopped and will remain stopped as long as the overload threshold level is exceeded. Such narrow band overloads are typically of a sustained nature and hence the maximum observation time (i.e., the timing period of timer 20) will invariably be exceeded when such overloads occur. This, of course, results in the actuation of an overload indicator lamp.

High volume talker bursts, such as shown in FIG. 2B, will occasionally exceed the threshold level and thus momentarily stop the sweep. Such talker bursts are, however, of relatively short duration (e.g., several milliseconds) and their effect on the overall sweep is therefore of little consequence. That is, even with the occurrence of sporadic talker bursts, the sweep of the group spectrum is normally completed prior to the timer 20 timing out.

A broadband overload, such as that shown by the dot-dash line of FIGS. 2A and 2B, often causes intermodulation noise problems, even though no single frequency component thereof exceeds the threshold level. Such an overload does not stop the sweep completely but it does significantly reduce the sweep speed over a large portion of the group spectrum. Accordingly, in the presence of such a broadband overload the sweep speed or rate is reduced for an extended period with the result that the timer 20 typically times out before the completion of the sweep. The appropriate overload indicator lamp is thus activated.

Turning now to FIG. 3 of the drawings, there is shown therein a schematic diagram of the sweep control and sweep generator circuitry. The output of the rectifier filter 15 is delivered to the base of NPN transistor 32 via the variable resistance 31. In the absence of an input, the transistor 32 is just at cutoff. The requisite linear sawtooth voltage is developed across the relatively large (e.g., 9.0 $\mu$f.) capacitor 33. This capacitor is initially discharged to a potential of $V_0$ in a manner to be described. After discharge, the capacitor begins to recharge, the charging path comprising transistor 34 and resistance 35. With transistor 32 cutoff all of the current $I_1$ is delivered to the charging capacitor 33.

Transistors 37 and 38 are connected in a Darlington configuration; hence, transistors 37 and 38 appear as a high gain amplifier presenting a very high impedance (e.g., 20 megohms) to the capacitor 33 so that there is negligible leakage current. The transistor 39 is connected in a conventional emitter follower configuration and it serves to deliver the desired sweep signal to the oscillator 13 and Schmitt trigger 18.

As the charging current is delivered to the capacitor 33, a linear sawtooth voltage is developed thereacross and a corresponding linear sweep signal is delivered to the oscillator 13 to sweep the frequency thereof from 110 to 158 kHz. When the output voltage from the sweep generator reaches the Schmitt trigger threshold, the reset relay 19 is energized and a first pair of contacts (i.e., contacts 30) "make" and discharge the charging capacitor of the sweep generator all as heretofore described. With contacts 30 momentarily closed the capacitor 33 discharges through the Zener diode 36 to the desired initial value of $V_0$, which is the Zener breakdown voltage. When the contacts 30 subsequently open the capacitor 33 begins to recharge once again.

The sweep control part of the circuit is made up of transistor 32. The rectified and filtered output of the band-pass filter 14 is coupled to the base of transistor 32 causing the same to conduct. As the output signal from the band-pass filter increases, the transistor 32 conducts more heavily (i.e., current $I_2$ increases proportionally) until $I_1 = I_2$ and then the sweep stops. The capacitor potential $V_c$ is given by the equation $$V_c=\int_0^T \frac{(I_1-I_2)\,dt}{c}+V_0$$

The charging current delivered to the capacitor 33 is, of course, the difference between $I_1$ and $I_2$ and hence when $I_1 = I_2$ the charging of the capacitor is stopped. The variable resistance 31 permits the selection of the threshold level at which the sweep is stopped; this value is usually arrived at empirically.

The base of transistor 41 is connected to the collectors of transistors 37 and 38 and a feedback connection is provided from the collector of transistor 41 to the base of transistor 34. This feedback loop causes the potential at the base of transistor 34 to rise in step with the potential across the capacitor 33. This keeps the current $I_1$ constant so that the capacitor charges at a substantially uniform rate, taking into consideration, of course, the effect of current $I_2$. The transistors 41 and 34 comprise a typical "boot-strap" circuit configuration. The variable resistance 42 sets the initial voltage at the base of transistor 34 and this sets the initial value of current $I_1$ and therefore controls the maximum sweep speed.

The groups of signal channels delivered to the modulator 11 via the stepping switch 12 are, of course, of the same frequency spectrum, i.e., 60 to 108 kHz. This represents an intermediate stage in the frequency translation process. Prior to the actual transmission via a land or submarine cable, for example, the groups are further translated to successively higher frequencies and the groups transmitted in a frequency division multiplexed manner.

While NPN junction-type transistors have been shown in FIG. 3, it will be clear that transistors of the other conventional types may be used. It is to be understood that the foregoing disclosure relates to only a preferred embodiment of the invention and that numerous modifications or alterations may be made therein without departing from the spirit and scope of the invention.

I claim:

1. An overload monitoring system for detecting the presence of overload signals in any channel of a group of frequency division multiplexed signal channels comprising band-pass filter means serving to pass a narrow band of frequencies, means for effectively sweeping said narrow band over said group of frequency multiplexed channels, means for controlling the rate of sweep of said narrow band in proportion to the difference between the power output of said band-pass filter means and a preselected power threshold level, and means for producing an alarm indication when said sweep of said narrow band over said group of frequency multiplexed channels exceeds a predetermined time interval.

2. An overload monitoring system as defined in claim 1 wherein the sweep control means further serves to stop the sweep of said narrow band when said power output exceeds said preselected threshold level.

3. An overload detector comprising a modulator, means for connecting one of a plurality of groups of frequency division multiplexed signal channels to the input of the modulator, a band-pass filter connected to the output of the modulator and serving to pass a narrow band of frequencies, oscillator means for delivering a carrier signal to the input of the modulator, means for varying the frequency of said carrier signal over a given frequency spectrum to thereby effectively sweep the narrow band of the band-pass filter over the input group of frequency multiplexed channels, means for controlling the rate of sweep of said narrow band in proportion to the difference between the power output of the band-pass filter and a preselected power threshold level, and means for producing a signal indication when said sweep of said narrow band over the input group of frequency multiplexed channels exceeds a predetermined time interval.

4. An overload detector as defined in claim 3 wherein the sweep control means further serves to stop the sweep of said narrow band when said power output exceeds said preselected threshold level.

5. An overload detector as defined in claim 4 wherein each of said plurality of groups of frequency multiplexed channels is connected in succession to the modulator input.

6. An overload detector as defined in claim 5 including means for varying the power threshold level.